United States Patent [19]

Michel-Kim

[11] Patent Number: 4,987,115

[45] Date of Patent: Jan. 22, 1991

[54] METHOD FOR PRODUCING GENERATOR GAS AND ACTIVATED CARBON FROM SOLID FUELS

[76] Inventor: Herwig Michel-Kim, Bamberger Strasse 41, 1000 Berlin 30, Fed. Rep. of Germany

[21] Appl. No.: 248,808

[22] Filed: Sep. 23, 1988

[30] Foreign Application Priority Data

Sep. 25, 1987 [DE] Fed. Rep. of Germany ....... 3732867

[51] Int. Cl.$^5$ ............ C01B 31/10; C10J 31/02; C10J 31/06; C10J 31/54
[52] U.S. Cl. .................... 502/419; 48/197 R; 48/203; 423/415 A; 423/449; 110/229
[58] Field of Search ............... 502/419, 421, 431, 433, 502/435; 423/415 A, 449; 201/35; 48/203, 197 R; 110/229, 208, 209, 248, 255, 257; 202/113, 115, 116

[56] References Cited

U.S. PATENT DOCUMENTS 2,280,611 4/1942 Adler .................................. 502/419

FOREIGN PATENT DOCUMENTS 50137 3/1889 Fed. Rep. of Germany .
3335544 4/1985 Fed. Rep. of Germany .
WO87/04453 7/1987 PCT Int'l Appl. .............. 48/197 R

*Primary Examiner*—Paul E. Konopka
*Attorney, Agent, or Firm*—Basile and Hanlon

[57] ABSTRACT

A method and an apparatus for producing generator gas and activated carbon from solid fuels. A first gasification stage is supplied with fuel by an underfeed charging system and preheated air, the air and fuel being supplied in the same direction. In a second gasification stage and accompanied by the supply of secondary air, an intermediate gasification takes place. Finally, in a third gasification stage, the gas is reacted with glowing coke or charcoal, and the heat of the exiting gas is used for heating the air. The fuel centrally entering the first gasification stage is led from the inside to the outside and then upwards. Part of the entering fuel is precombusted in a precombustion chamber linked with the supply of the preheated air for reducing the oxygen content of the preheated air. In the intermediate gasification stage, the gas with the admixed air is passed through a Venturi nozzle or tube with a diffuser. The flue coal entrained from the first gasification stage is at least partly returned to the throat of the Venturi tube. The return is assisted both by vacuum in the Venturi tube and mechanically.

6 Claims, 4 Drawing Sheets

METHOD FOR PRODUCING GENERATOR GAS AND ACTIVATED CARBON FROM SOLID FUELS

BACKGROUND OF THE INVENTION

1. Field of the Invention

The invention relates to a method for producing generator gas and activated carbon from solid fuels, as well as to an apparatus for performing the method.

2. Description of the Relevant Art

German Laid-Open Patent No. 33 35 544 discloses a reactor means for producing lean or generator gas from biomasses or other carbonizable by-products. It has a primary gasifier and a series-connected secondary gasifier, to each of which air is supplied. A flue flow gas converter is provided between the primary gasifier and the secondary gasifier. An intermediate gasification takes place in the gas converter. The fuel is supplied proportionally by means of an underfeed charging system, and the gasification air is introduced through a ring nozzle or a central nozzle in a rotationally symmetrical manner. There is a substantial heat return or recycling of hot, exiting generator gases to the gasification air and preheating of the fuel.

It has been found that different fuels, even those with a high water content, can be gasified by the known apparatus in an environmentally safe manner. The apparatus achieves relatively high efficiency levels and solves sewage problems in connection with the tar and phenol contents. However, it has been found that there is a risk of the coal encrusting under the existing fill level sieve or screen in the primary reactor. The known apparatus is used both in the case of small and larger installations, and it has been found that instabilities occur in the primary reactor. The through-flow with air can become onesided after a few hours' operation and can lead to channelling with subsequent slag formation. Due to the fuel grain size and the specific operating capacity levels, the generator gas in the primary stage contains too much flue coal, which blocks the secondary reactor. There is consequently a fluctuation in the pressure losses, and a large amount of coal must be discharged from the secondary reactor in the form of fine coal, which is not usable, since the secondary reactor requires reactive coke which is coarse-grain and relatively hard. Simultaneously, there are fluctuations in the coke consumption in the secondary reactor. This can lead to high costs under least favorable operating conditions.

German Patent 50 137 describes a gas generator with a combustion chamber to which fresh fuel is supplied from above. Under the fresh fuel layer, there is an ash layer on the bottom plate provided beneath the combustion chamber. The bottom plate can be rotated by means of a crank, so that the ash drops over the edge of the bottom plate into an ashpit. Air and/or steam is passed through the bottom plate into the combustion chamber.

The object of the present invention is to provide a method and an apparatus for producing generator gas and activated carbon from slid fuels, whose operating conditions are constant regardless of the apparatus size. Another object of the present invention is to make it possible to rapidly regulate the individual operating quantities. Yet another object is to provide a method and apparatus which efficiently produces a generator gas with a high purity level.

SUMMARY OF THE INVENTION

The present invention solves the problems, mentioned above, by characterizing features. In a precombustion chamber, part of the fuel is burnt for reducing the oxygen content of the gasification air. This chamber, along with the turntable or rotary bottom in the first gasification stage, provides a good distribution of the fuel in the first gasification stage. Therefore, no channels and slag can form. This applies both in the case of large and small reactors, so that the operating conditions are independent of the size of the installation. As a result of the circulating return of the flue coal in the intermediate gasification area, the flue coal residence time is greatly increased, so that the reduction process in the intermediate gasification stage is improved. The exit temperatures of the gases from the intermediate gasification area are lowered as a result of the endothermic reduction process, and simultaneously, the calorific value of the gas is increased. Activated carbon can be reduced by the regulated, circulating flue coal return.

The level measurement takes place with an axially displaceable, rotating level rotor with pitch or setting faces which is similar to a propeller. The level device sinks into the often fine-grain coal bed of the first gasification stage. This is due to the fact that the blades of the level rotor are given a lift by the rotation and the setting or pitch angle. The coal is prevented from sticking on the blades.

BRIEF DESCRIPTION OF THE DRAWINGS

The invention is described in greater detail hereinafter relative to non-limitative embodiments and the attached drawings, wherein.

DETAILED DESCRIPTION OF THE INVENTION

Figure 1:
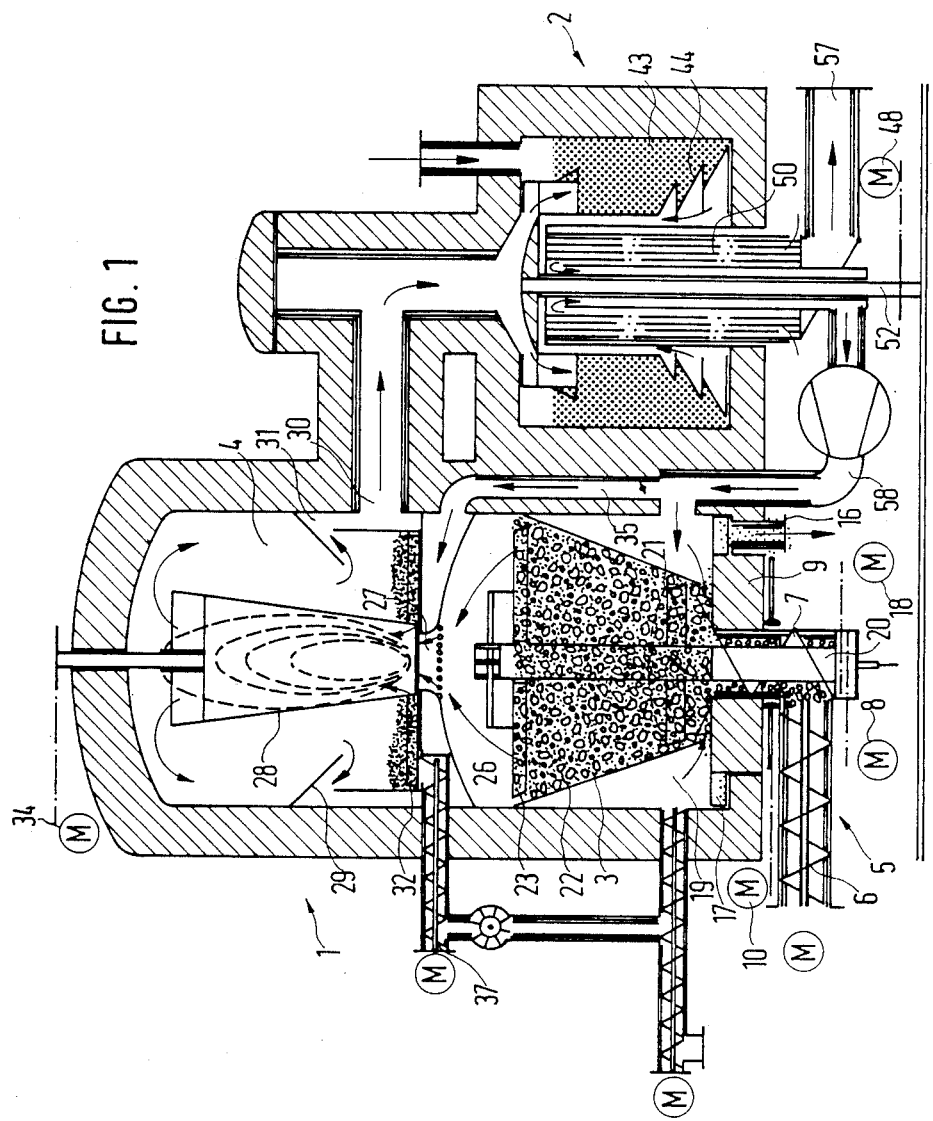
FIG. 1 is a section through an embodiment of the invention with all three gasification stages.
Figure 2:
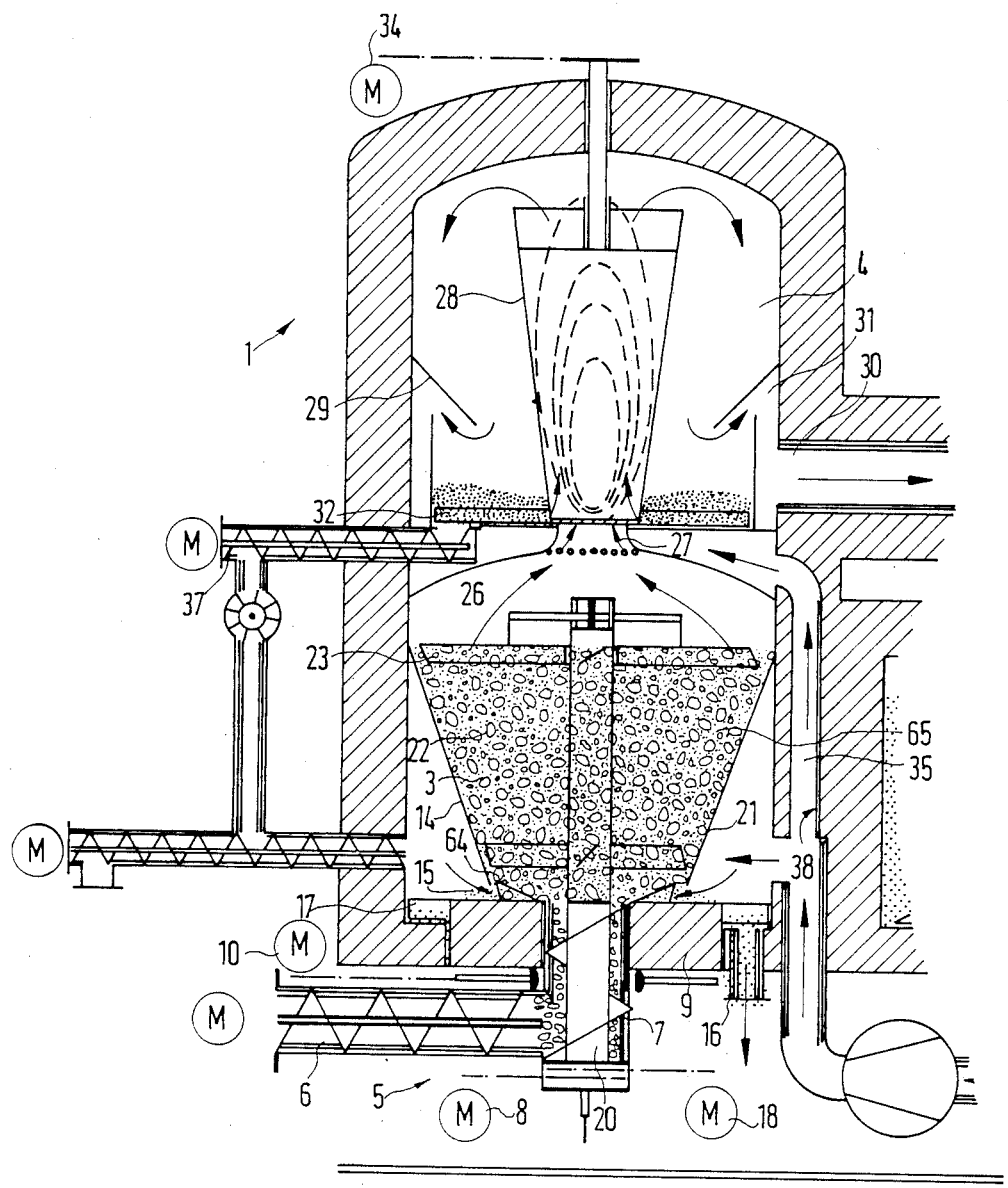
FIG. 2 is a larger scale section through the first and second gasification stages.

Shown in FIG. 1 is a first reactor 1 and a second reactor 2, which are spatially separated in the represented embodiment. The first reactor 1 is shown on a larger scale in FIG. 2. First reactor 1 is provided with a first gasification stage 3 and a second gasification stage forming an intermediate gasification area 4. First reactor 1 also has an underfeed charging means 5, which comprises a proportioning screw 6, a vertical feed screw 7 and a speed-regulated drive 8. The bottom of the first reactor 1 is constructed as a turntable 9, which is rotated by a speed-regulated drive 10.

Figure 3:
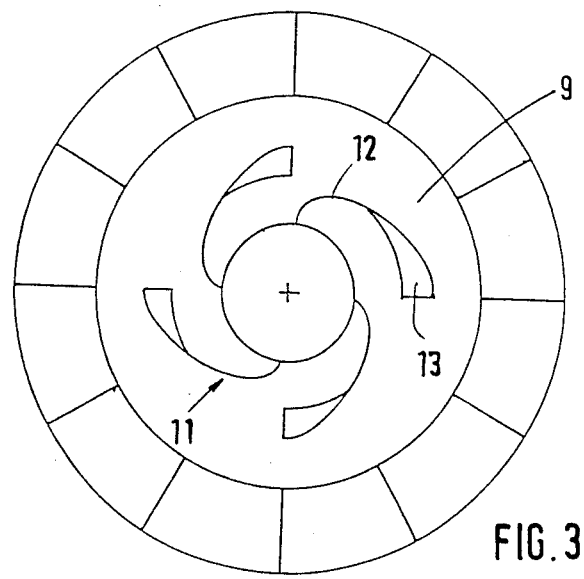
FIG. 3 is a plan view of the turntable of the first gasification stage with deflector plates for fuel distribution and rotary sectors of the precombustion chamber.

As shown in FIG. 3, guide blades 11 are arranged on the turntable 9. In the preferred embodiment, the blades 11 feed the fuel outwards and then upwards. FIG. 3 shows the turntable 9 with guide blades 11, which for feeding outwards, are constructed as spiral plates 12, and for feeding upwards are constructed as angular, radially positioned plates 13, the latter being located on the ends of the guide blades 11.

Referring back to FIG. 2, in a first gasification stage 3, the fuel is received in a funnel-shaped vessel 14, which is open at the top and bottom. An air gap 15 is provided between the turntable 9 and the lower end of vessel 14. The lower end of vessel 14 represents a connection between the interior of vessel 14 and a precombustion chamber 19. Precombustion chamber 19 is in the lower area of the first reactor 1, between its wall and the vessel 14. A precombustion of a partial fuel flow takes place in the chamber 19. In the vicinity of the bottom of the first reactor 1, rotary sectors 17 are arranged in the precombustion chamber 19 and rotate together with turntable 9 to convey the precombusted fuel to a downcomer 16. A shaft 20, rotatable by means of a drive 18, projects through the vertical feed screw 7 into the interior of the first reactor 1. Upwardly set stirring blades 21 are located on the shaft 20 within vessel 14.

A fuel bed 22 in vessel 14 is covered by a floating, axially displaceable, rotationally symmetrical fill level rotor 23. The rotor 23 scans or senses the fuel level and is connected to a control loop (not shown). To avoid encrustations and caking, the level rotor 23 is rotated and is driven by means of shaft 20. Level rotor 23 is provided with setting plates (not shown), which impart a lift to the rotor 23 as a result of the rotation, and consequently avoid sinking into the highly fluid, fine coal. The speed of level rotor 23 is regulated as a function of the fuel grain size and the gas through put the vessel 14. Therefore, either only that amount of flue coal is discharged as is brought into the intermediate gasification stage, or the amount discharged is the quantity optimum for producing activated carbon as the coupling product.

The second gasification stage 4, constructed as an intermediate gasification area, has a combustion zone 26, which is continued in a Venturi tube or nozzle 27 with a diffuser 28. Roughly at the central height of diffuser 28, a centrifual force separator 29 is arranged on the outer wall of the second gasification stage 4. A hot gas pipe 30 leads from the area 31 shielded by the centrifugal force separator 29 into the second reactor 2.

Figure 4:
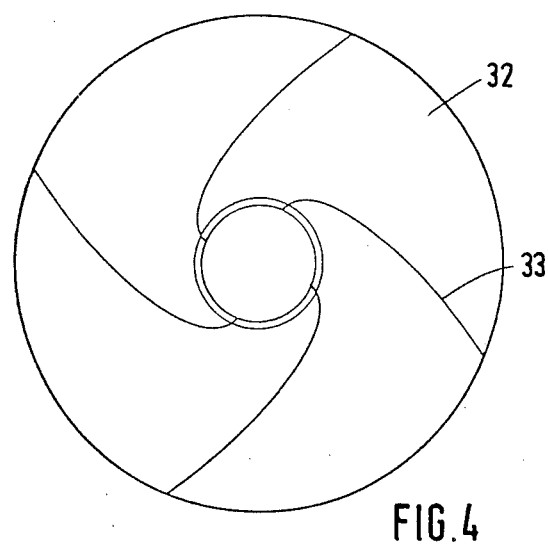
FIG. 4 is a plan view of the rotary valve of the second gasification stage with deflector plates for flue coal guidance.

The bottom of the intermediate gasification area 4, level with the throat or groove of the Venturi tube, is constructed as an externally driven rotary valve 32, which is shown in greater detail in FIG. 4. This rotary valve 32 is provided with curved deflector plates 33, so that on rotating in one direction, the flue coal is led inward to the throat of Venturi tube 27, while rotation in the opposite direction leads it outwards. A discharge screw 37 is provided below the outer marginal area of the rotary valve 32. The discharge screw 37 feeds the flue coal obtained to the outside. The rotary valve 32 is driven from above by means of a motor 34. The diffuser 28 is also rotated.

The air for the intermediate gasification area 4 is also preheated and passes via a channel 35 into the area of the combustion zone 26 and the Venturi tube 27. By means of a constrictor 38, the air quantity is regulated as a function of the temperature in the diffuser 28.

Figure 5:
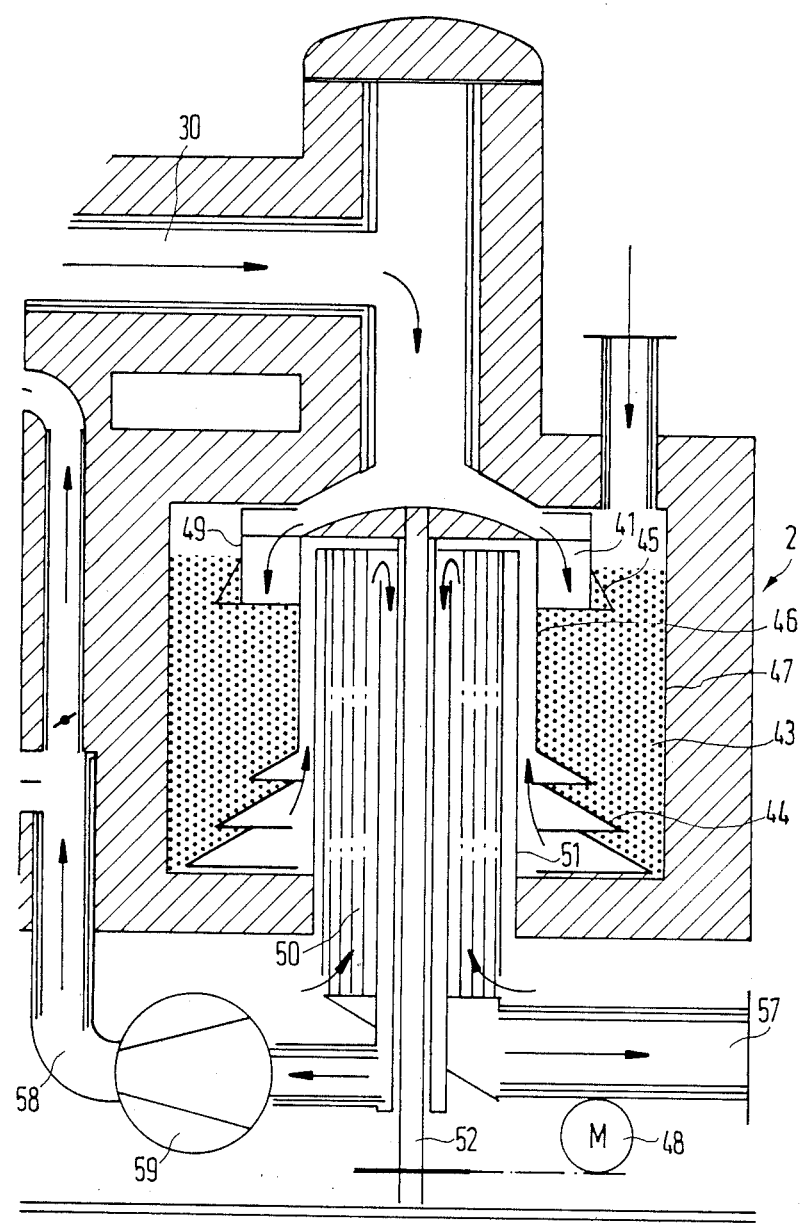
FIG. 5 is a section through the third gasification stage.

As seen in FIG. 5, the first reactor 1 is connected by means of the hot gas pipe 30 to the second reactor 2 which is the third gasification stage, is constructed as a coke gasifier, and contains a glowing coke bed 43. The coke bed 43 is positioned on a rotary, rotationally symmetrical step grate 44. The step grate 44 makes it possible to use fine coke or charcoal, because the coke cannot drop through the grate bars. The step grate 44 passes upwards into a jacket 46 with a relatively large diameter, which is approximately 30 to 50% of the diameter of the reactor wall 47. In the upper region, an annular casing or channel 41 is provided on jacket 46. Hot gas pipe 30, above coke bed 43 and step grate 44 issues centrally into annular casing 41. By means of web plates, the outer casing 49 of annular channel 41 is firmly connected to jacket 46, so that it rotates therewith. Annular casing 41 is also provided with dogs 45 for distributing the coke.

Within the jacket 46 of the step grate 44, a gas-air tubular heat exchanger 50 is arranged in fixed manner. A hot gas pipe 57 leading to the scrubber is connected to the tubular heat exchanger 50. In order to prevent clogging of the tubular heat exchanger 50, a fixed screen or sieve 51 is arranged between the heat exchanger 50 and jacket 46. A shaft 52 connected to jacket 46 passes centrally through the heat exchanger 50 and is rotated by a drive 48.

An air pipe 58 is arranged between the second reactor 2 and the first reactor 1. The air pipe 58 supplies air into the first reactor 1 for gasification purposes, by issuing into the precombustion chamber 19 and into the channel or duct 35 to the second gasification stage. The gasification air is sucked or pressed by a speed-regulated blower 59 through the heat exchanger 50 into air pipe 58, the speed being regulated in such a way that there is a zero pressure difference between the preheated gasification air in the percombustion chamber 19 and the external pressure.

The apparatus of the present invention functions in the following way. By means of the horizontal proportioning screw 6 and the vertical feed screw 7, driven synchronously with the proportioning screw 6, fuel is fed from a metering bunker and passes rotationally symmetrically into the first gasification stage 3. Fuel charging is regulated with the aid of a cascade control from: the gas through put vessel 14 and/or the fill level in the first gasification stage 3; and/or from the gas through put vessel 14; and/or the exit temperature of the gas from the first gasification stage 3; and/or the mixture calorific value of the gas in the second gasification stage 4. The control variable is the gas through put vessel 14, which is sensed with a suitable sensor, the sensor supplying an electrical signal, which controls the control loop (not shown) of level rotor 23, e.g., a potentiometer contained in the control loop. Another possibility for the control of the fuel charging involves linking the gas throughput signal with a signal indicating the temperature of the gas leaving the primary gasification area by means of a cascade PID controller (i.e., a Proportional Controller with Integrator and Differentiator). This leads to a constant fuel charging in the case of load changes.

The guide blades 11 of turntable 9 feed the fuel radially outwards and then upwards, as a function of the speed of blades 11, in the vicinity of air gap 15. This prevents channelling and slag formation in the lower first gasification stage 3 within the fuel. A small part of the fuel is passed by turntable 9 through the air gap 15 into the precombustion chamber 19, where it is burnt by the preheated air supplied by means of air pipe 58, e.g., at 500° C. into the secondary reactor 2. This precombustion chamber burning serves to reduce the oxygen content of the gasification air, preferably by 20 to 25%, and consequently prevents any slag formation in the first gasification stage 3. The speed of turntable 9 is regulated in such a way that up to about 15% and generally up to 5% of the fuel passes into the precombustion chamber 19. Turntable 9 also keeps air gap 15 symmetrically free, and ash and possibly stones are discharged into the precombustion chamber 19 and conveyed with the aid of the rotary sectors 17 to downcomer 16.

The preheated gasification air, whose oxygen content has already been reduced by the precombustion in precombustion chamber 19, passes through the air gap 15 into the fresh fuel and forms the oxidation zone 64 of the gasification. In this oxidation zone 64 with temperatures of about 850° C., most of the carbonization gases released during combustion are burnt. What remains is a charcoal or peat or lignite coke, which is forced upwards by the following fuel into the reaction zone 65, the stirring blades 21 assisting the feed action and simultaneously leveling the bed. A heated carbonaceous material, chosen from the group consisting of glowing charcoal, glowing coke, or the like, is available there for the reduction process. This gasification process, with the fuel and combustion air flowing in the same direction and accompanied by precombustion chamber burning, leads to a generator gas with tar and phenol contents well below 1% in the first gasification stage 3. The water content of the gas in the case of wood-like fuels is generally over 15%.

This gas undergoes a cracking process in the intermediate gasification area 4 in order to split off virtually all the higher molecular hydrocarbons. This cracking process is assisted by the high hydrogen contents. When the gas from the first gasification stage 3 passes into the combustion zone 26 of the intermediate gasification area 4, it is partly burnt with the air flowing through duct 35, whose quantity is regulated as a function of the temperature in diffuser 28. The cracking temperature is generally approximately 900° C., but in special cases, e.g., the gasification of special refuse or garbage, higher temperatures must be set.

Combustion first takes place in the Venturi tube 27, and the gas is adequately whirled in the series-connected diffuser 28. A vacuum is produced in the throat of the Venturi tube or nozzle 27, which permits a suction from the side. At the upper end of diffuser 28, the gas is deflected by approximately 180° and is led downward. After roughly half the intermediate gasification, a large part of the gas is again deflected outwards by 180° on the centrifugal force separator 29. The flue coal with particle sizes over 0.1 mm is separated and is sucked off by means of the gas pipe 30 and passed into the reactor 2.

The separated flue coal drops onto rotary value 32 on the bottom of the intermediate gasification area 4 and, as a function of the rotation direction, is fed by the deflector plates 33 to the discharge screw 37, or is returned inward to the throat of Venturi tube 27, where it is subject to vacuum suction action. As a result of this separation and return of the flue coal, there is an enrichment of the flue coal from the first gasification stage 3 in the intermediate gasification area 4. The residence time of the flue coal is significantly increased, so that as a result of the concentration of the flue coal in the intermediate gasification area 4, the reduction process is greatly assisted. The exit temperatures of the gas from the intermediate gasification area 4 are reduced as a result of the endothermic reduction process, so that coke consumption in the second reactor 2 is reduced.

If the exit of the flue coal from the first gasification stage 3 is regulated in such a way that it just corresponds to the coal consumption in the intermediate gasification area 4, there is an optimum final combustion of the fuel in the first gasification stage. As a result of the regulated flue coal return into the Venturi tube 27, with regulatable residence time in the intermediate gasification area 4, it is possible to bring about a further application of the process.

This further application is the planned production of high-grade, fine-grain activated carbon resulting from a reduction of fine coal in a steam or carbon-dioxide ambient at temperatures above 800° C. To achieve this high-grade activated carbon, the discharge of flue coal from the first gasification stage 3 is increased to beyond the stoichiometric coal consumption of intermediate gasification by increasing the speed of the level rotor 23. The flue coal residence time in the intermediate gasification area 4 is then regulated by means of the discharge speed of discharge screw 37. By removing activated carbon from a temperature range of roughly 700° C., it is ensured that the coal is largely free from higher molecular weight, surface-attached hydrocarbons. In order to activate externally supplied coke or to regenerate activated carbon, they can be, for example, dosed into the intermediate gasification area (introduced in controlled amounts).

The gas leaving the intermediate gasification area 4 is substantially free from tar, so that the washing and condensation water complies with the infeed regulations of sewage works. In principle, there would be no need for a further gasification stage if the flue coal proportion from the primary gasification was high enough. However, for safety reasons, and also in order to large utilize the sensible heat of the gas usable for the reduction processes, a coke generator is series-connected, and its glowing coke bed prevents the passage of tars in case of operating faults.

The gas passes out of the intermediate gasification area 4 via a gas pipe 30 at temperatures of 650° to 800° C., passes into the annular channel 41 of the second reactor 2, and from there flows through the glowing coke bed 43 in the same direction as the coke, which is fed in from above. The gas passing through the step grate 44 is passed through a ring channel within the jacket 46 in the upwards direction. From there, the gas passes through the pipes of the heat exchanger 50 integrated into the step grate 44 in the downward direction, and from there is passed via the hot gas pipe 57 at approximately 450° C. to the scrubber. The heat given off by the gas in the heat exchanger 50 is used for heating the gasification air for the first reactor 1, which is sucked by blower 59 into heat exchanger 50.

It is possible in the described embodiment to construct the first reactor in modular manner, i.e., the upper part of the first reactor can be removed and the parts present in the lower area of the first reactor 1 can be inserted or plugged in from above. Thus, the reactor can be rapidly re-equipped for different operating conditions, and repairs can be simplified.

Having thus described the invention, what is claimed is:

1. A method for producing generator gas and activated carbon from solid fuel, the method comprising the steps of:
  initially gasifying the solid fuel in a first gasification stage, the first gasification stage comprising:
    supplying an admixture of the solid fuel and preheated air, the solid fuel being supplied by an underfeed charging element, the solid fuel and air flowing in the same direction;

directing the solid fuel centrally inward, then outward and upward in a vessel, thereby symmetrically distributing the solid fuel and air admixture;

preburning a portion of the entering solid fuel in a precombustion chamber, the precombustion chamber communicating with the preheated air; and reducing the oxygen content of the preheated air by precombustion in the precombustion chamber;

wherein the fuel upon leaving the first gasification stage consists essentially of coal and generator gas;

further gasifying the fuel from the first gasification stage in an intermediate gasification stage, the intermediate gasification stage comprising:

passing the first gasification stage fuel with a supply of secondary admixed air through a Venturi tube having a throat, and through a diffuser connected to the tube;

wherein the fuel upon leaving the intermediate gasification stage consists essentially of flue coal and generator gas substantially free from tar and phenols;

returning a portion of the flue coal entrained from the intermediate gasification stage to an area adjacent and prior to the Venturi tube throat, assisting the return mechanically and by a vaccum in the Venturi tube;

recycling at least some of said flue coal through said intermediate gasification stage whereby after a plurality of recyclings activated carbon is produced and recovered; and further gasifying the generator gas from the intermediate gasification stage in a third gasification stage, the third gasification stage comprising:

reacting the generator gas with a heated carbonaceous material chosen from a group consisting of glowing charcoal and glowing coke;

wherein the generator gas exiting the third gasification stage gives off heat, and the heat is used to heat the air for the first and second gasification stages.

2. The method according to claim 1, wherein the apparatus achieving the method, in the first gasification stage, has a fuel bed with a fill level and the generator gas leaving the first stage has an exit temperature, and in the intermediate stage, the generator gas has a mixture calorific value, and the method further comprises the step of:

charging the solid fuel constantly, and as a function of the generator gas through put, the fill level of the fuel bed in the first gasification stage, the generator gas exit temperature from the first gasification stage, and the mixture calorific value of the generator gas in the intermediate gasification stage.

3. The method according to claim 1, wherein the apparatus achieving the method in the first gasification stage has a bottom, and the solid fuel therein has a grain size, and the method further comprises the steps of:

distributing the solid fuel by rotating the bottom; and regulating the speed of the bottom as a function of the fuel grain size and the fuel supply in such a way that up to approximately 15% of the fuel is passed into the precombustion chamber.

4. The method according to claim 1, further comprising the step of:

supplying preheated air to the intermediate gasification stage, the air supply being regulated as a function of the temperature in the diffuser.

5. The method according to claim 1, wherein the flue coal quantity and the flue coal residence time in the intermediate gasification stage is regulated by the rate of the returning of the flue coal entrained from the intermediate gasification stage, and by the rate of coal passing from the first to the second gasification stage.

6. The method according to claim 1, wherein the air for the first and second gasification stages is heated by using the heat of the gas exiting the third gasification stage, and the quantity of the preheated gasification air is regulated in such a way that in the precombustion chamber of the first gasification stage, the preheated air has the same air pressure as the external air.

* * * * *